United States Patent [19]

Emmermann

[11] Patent Number: 5,740,540
[45] Date of Patent: Apr. 14, 1998

[54] METHOD FOR TELEPHONE NUMBER NOTIFICATION AND STORAGE IN A PORTABLE RADIO

[75] Inventor: George A. Emmermann, Boca Raton, Fla.

[73] Assignee: Mototola, Inc., Schaumburg, Ill.

[21] Appl. No.: 554,581

[22] Filed: Nov. 6, 1995

[51] Int. Cl.⁶ ............................................. H04M 11/00
[52] U.S. Cl. .......................... 455/458; 455/567; 455/459
[58] Field of Search ........................... 379/58, 59, 251, 379/252, 61, 356, 355; 455/33.1, 551, 550, 403, 422, 458, 567, 459–161, 53.1, 54.1

[56] References Cited

U.S. PATENT DOCUMENTS

| | | | |
|---|---|---|---|
| 4,829,554 | 5/1989 | Barnes et al. | 379/58 |
| 4,833,701 | 5/1989 | Comroe et al. | 379/60 |
| 5,117,449 | 5/1992 | Metroka et al. | 379/58 |
| 5,363,429 | 11/1994 | Fujisawa | 379/58 |
| 5,365,572 | 11/1994 | Saegusa et al. | 379/61 |
| 5,506,894 | 4/1996 | Billings et al. | 379/127 |
| 5,526,401 | 6/1996 | Roach, Jr. et al. | 379/59 |
| 5,563,933 | 10/1996 | August et al. | 379/115 |
| 5,596,318 | 1/1997 | Mitchell | 340/825.44 |
| 5,627,528 | 5/1997 | Kuznicki | 340/825.44 |

OTHER PUBLICATIONS

Motorola, Inc., Technical Developments, Marcellus W. Cassidy, Prakash S. Patel & Lizabeth A. Cassidy, Method of Returning Unanswered Communication Requests By Target User, Mar. 1995, vol. 24, p. 66.

*Primary Examiner*—Dwayne Bost
*Assistant Examiner*—Tracy M. Legree
*Attorney, Agent, or Firm*—Frank M. Scutch

[57] ABSTRACT

A method for telephone number notification and storage in a two-way portable radio includes decoding (205) an incoming telephone number at a central station and successively transmitting (209) portions of the telephone number and a ring signal to a subscriber radio. The subscriber radio subsequently acknowledges (211, 217) receipt of the telephone number and uses this information to notify (321,323) a radio subscriber that a telephone call was received. The telephone call can be immediately answered or selectively stored (325) and retrieved by the subscriber at a later time. The invention is particularly useful in situations where the radio subscriber is away from the radio or was not able to hear the ring signal.

2 Claims, 5 Drawing Sheets

METHOD FOR TELEPHONE NUMBER NOTIFICATION AND STORAGE IN A PORTABLE RADIO

TECHNICAL FIELD

This invention relates in general to two-way radios and more particularly to telephone caller identification in two-way radio communication.

BACKGROUND

Many personal communication systems such two-way radios and their corresponding infrastructure have the capability of not only providing voice communication but may also be integrated into a land-based telephone system. This is accomplished through various types of telephone interface and telephone interconnect devices. This allows both incoming and outgoing telephone calls to be made using both the radio and radio system increasing both it's usefulness and utility.

Modern land-based telephone systems typically now include such features as caller identification or various call back and call forwarding options. The former enables the user to determine the origin of a call by alerting him to the caller's telephone number. The latter features enable the user to either call back or forward telephone calls in instances when the line is "busy" or persons are not present at a called location.

Previously, these types of options have not been available to users of two-way radio equipment such as those radio used in fleet type or trunked repeater radio systems. Thus, in the event a user is not near their radio or they are using it during a period when an incoming telephone call is received, the call is missed since there is no method by which the telephone number of the inbound caller can be stored by the radio and/or retrieved by the user. Moreover, a similar situation may also occur when the radio is used in a high noise environment. Although the radio may indicate that a call is being received, the user may not be able to actually hear the radio due to the extraneous noise which can overcome the radio's incoming call signal.

Heretofore these types as telephone features have not been incorporated into radio communications systems due the shear complexity of enabling the system's infrastructure and radios with these types of options. Thus, the need exists to overcome these shortcomings by providing a method in which incoming telephone calls call be stored and retrieved by a user while utilizing a two-way radio transceiver in a radio communications system.

DETAILED DESCRIPTION OF THE PREFERRED EMBODIMENT

Figure 1:
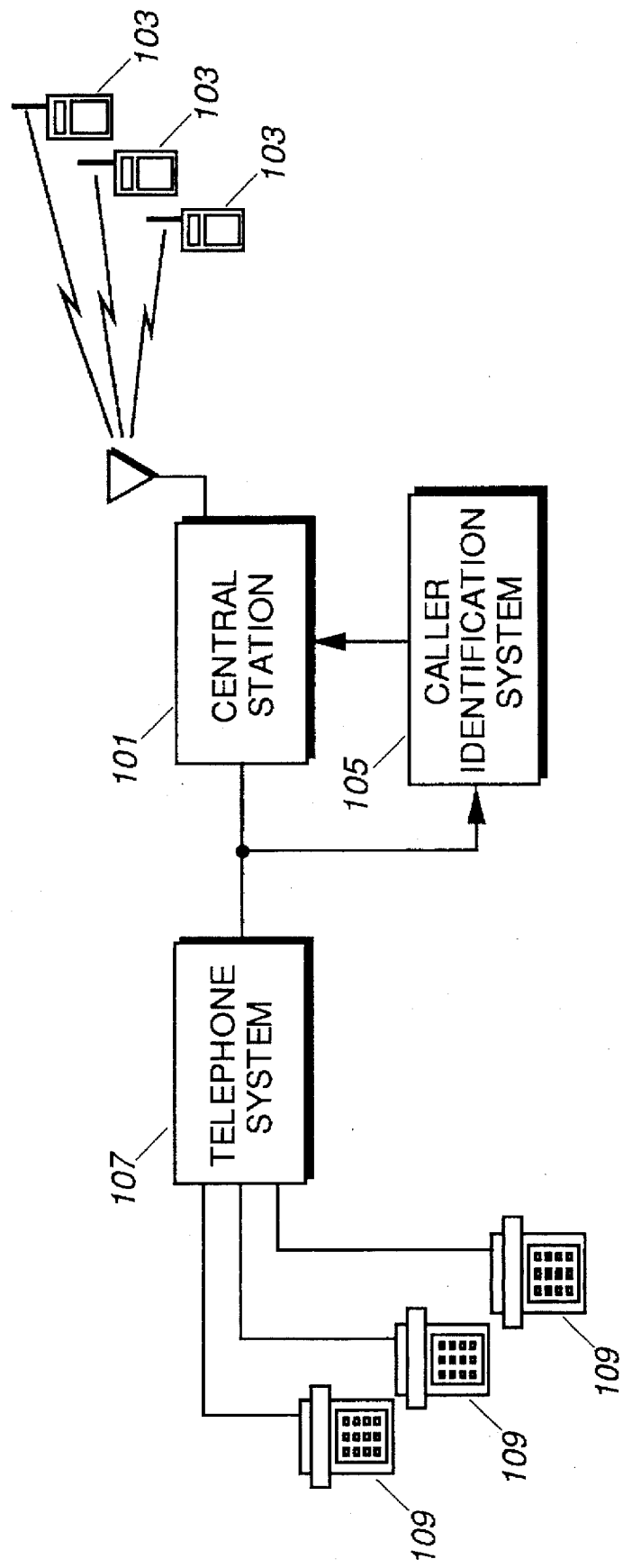
FIG. 1 is a block diagram showing a typical communications system as used with a telephone network in accordance with the preferred method of the present invention.

Referring now to FIG. 1, a block diagram of a two-way radio communication system 100 is shown in accordance with a preferred embodiment of the present invention. The communications system 100 includes a central station 101 which is used with one or more mobile or portable communication units such as subscriber radio 103. As is well known to those skilled in the art, the central station 101 is a repeater communications network or system which may be trunked with other repeaters in order to provide and greater and enhanced coverage area. The subscriber radio 103 include the capability of transmitting and receiving in a duplex mode and each preferable have an alphanumeric display and a digital tone multi-frequency (DTMF) keypad (not shown) capable of producing tones for accessing a telephone system integrated with the central station 101.

The central station 101 includes a caller identification system 105 having the capability of identifying the telephone number of an inbound caller to the central station 101. As is also well known in the art, these calls are initiated from a standard telephone system 107 which is connected to a plurality of telephone users 109. The telephone users initiate a telephone call that is processed by the telephone system 107. The telephone system 107 establishes contact or communication with the central station 101. The central station 101 is used as a node or central contact point between each of the subscriber radio 103.

Figure 2:
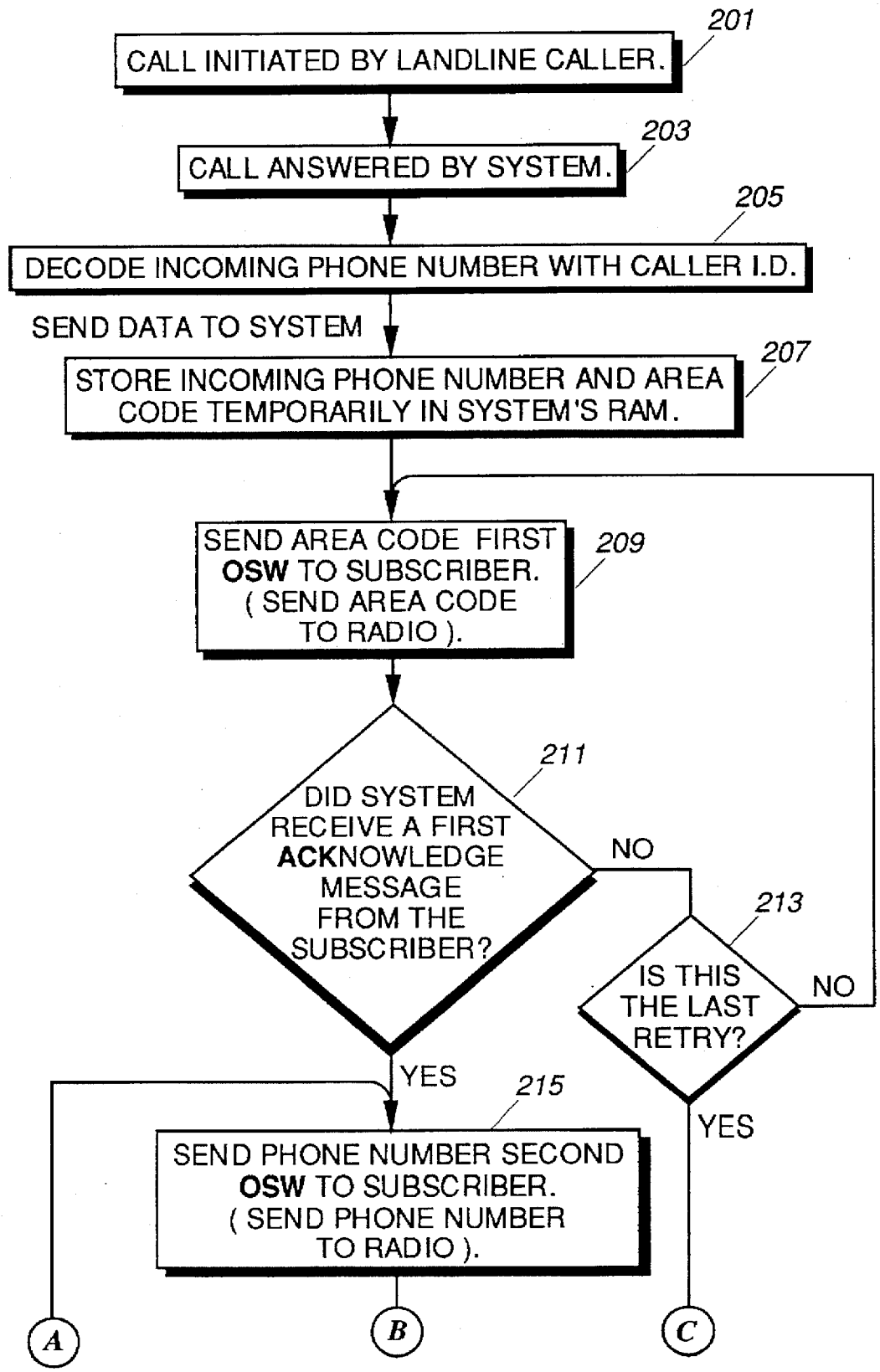
FIGS. 2 and 3 are flow chart showing the operational steps at central station using the telephone number notification and storage method in accordance with the preferred method of the invention.
Figure 3:
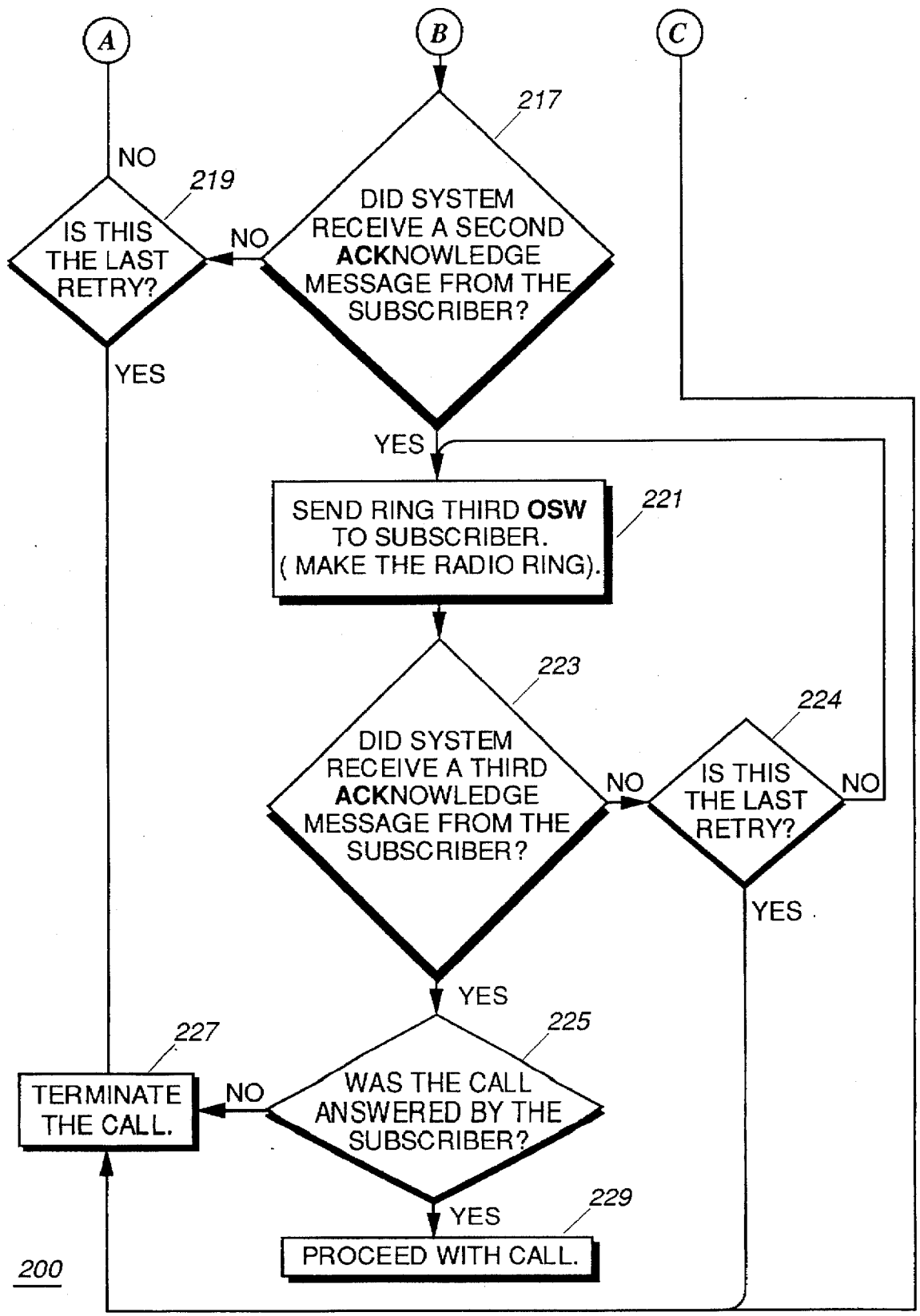

In FIGS. 2 and 3, a flow chart 200 shows operation at the central station 101. Initially, a call is placed by an outside party or landline caller 201 where it is then answered 203 by the central station. The caller's telephone number is decoded 205 and subsequently identified where it is then momentarily stored 207 in the central station's memory.

The central station then transmits or sends 209 a first outbound signaling word (OSW) to the addressed i.e. designated radio to which the call is directed. Among other things, the OSW contains the radio subscriber's address and a first portion of the telephone number such as the area code. After this information is sent, the central station waits a predetermined time to receive 211 a first acknowledgment ACK message from the subscriber radio. If a predetermined time to receive the first ACK is exceeded, the first OSW is subsequently retransmitted until a predetermined number of attempts 213 have occurred. After the expiration of the predetermined number of attempts, the central station ceases or terminates 227 all further attempts. Thus, the central station no longer attempts to transmit to the subscriber radio When a first ACK is received by the central station for the first OSW, a second OSW is sent 215 to the subscriber radio. Similar to the first OSW, the second OSW includes among other things, the radio's address and a second portion of the telephone number. The second portion also includes the remaining portion of the telephone number such as the telephone exchange and the four digit number as in a United States format. In similar fashion to the first OSW, the central station anticipates or waits 217 for a second ACK from the subscriber radio indicating the receipt of the second OSW. If the second ACK is not received, a predetermined number of additional attempts 219 are made to retransmit the second OSW to the subscriber radio. After the predetermined number of attempts has expired, no more attempts to transmit the second OSW to the subscriber radio occur and further communication is terminated 227.

When the second ACK is received by central station, the central station transmits 221 a third OSW to the subscriber radio. Like the first OSW and second OSW, the third OSW includes the radio's address and a control signal for signaling or triggering the radio to enter a ring mode. The ring mode may be either an audio, visual, or tactile signal or indication to the user that an incoming call is available to be received at the subscriber radio. After transmitting the ring signal, the central station again waits 223 for a third ACK from the subscriber radio that indicates the ring signal was received. In the event, the third ACK is not received, the ring signal is retransmitted a predetermined number of times 224. After the predetermined number is exceeded, no further attempts are made and the communication between central station and subscriber radio is terminated 227.

After the radio subscriber is signaled to ring, the user may then elect to receive the call 229 or store the telephone number locally where it can be retrieved at a later time. At the time of the ring mode, the user has the option to select or choose which inbound calls they wish to receive. Additionally, when in a noisy environment where the subscriber radio is active yet cannot be heard by the user, the telephone number may be automatically stored and be reviewed at a later time. This feature prevents calls to be missed when the ambient environment is too loud be heard when it would be impossible to have a telephone conversation.

Figure 4:
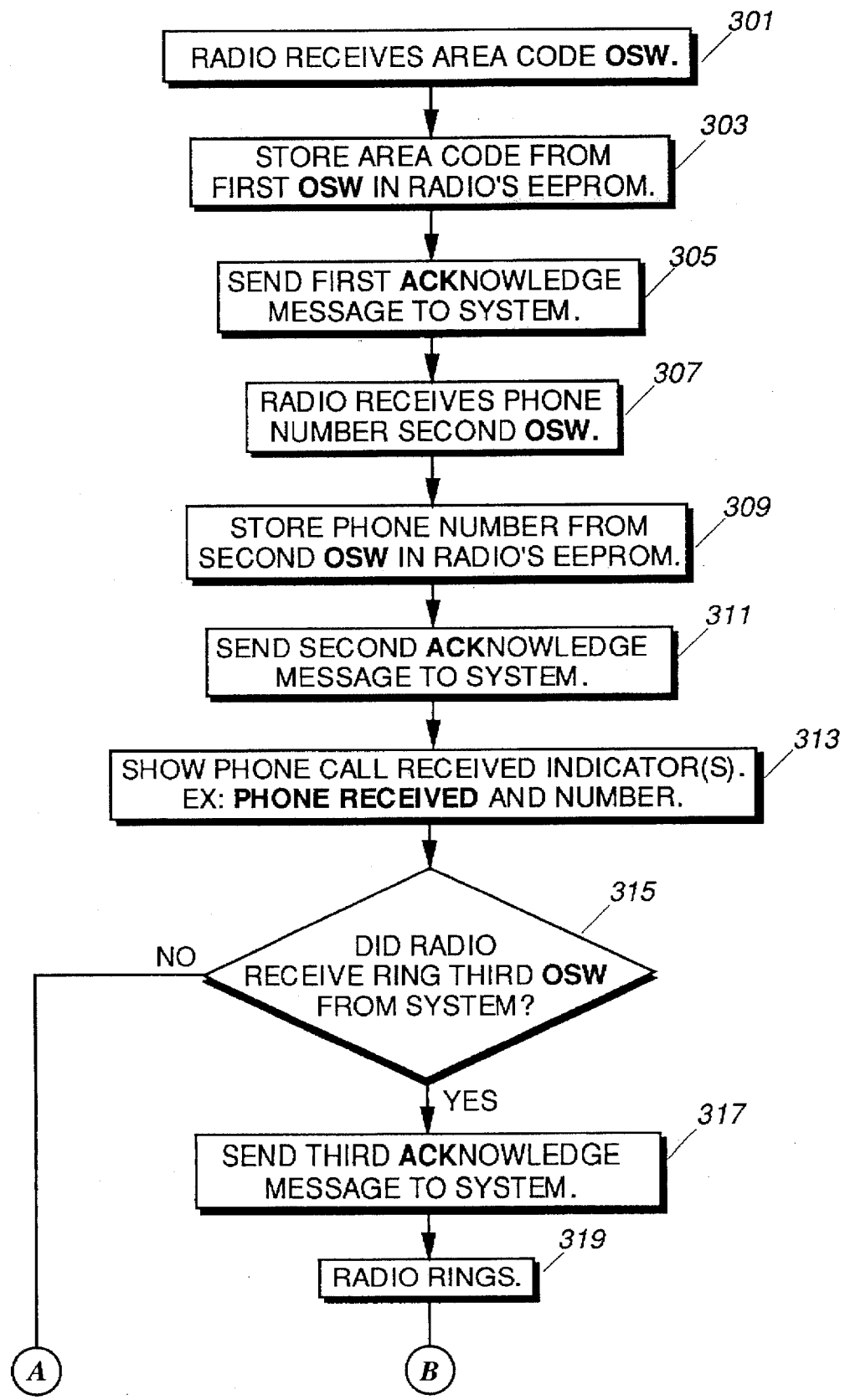
FIGS. 4 and 5 are a flow chart showing the operational steps at the subscriber radio using the telephone number notification and storage method in accordance with the preferred method of the invention.
Figure 5:
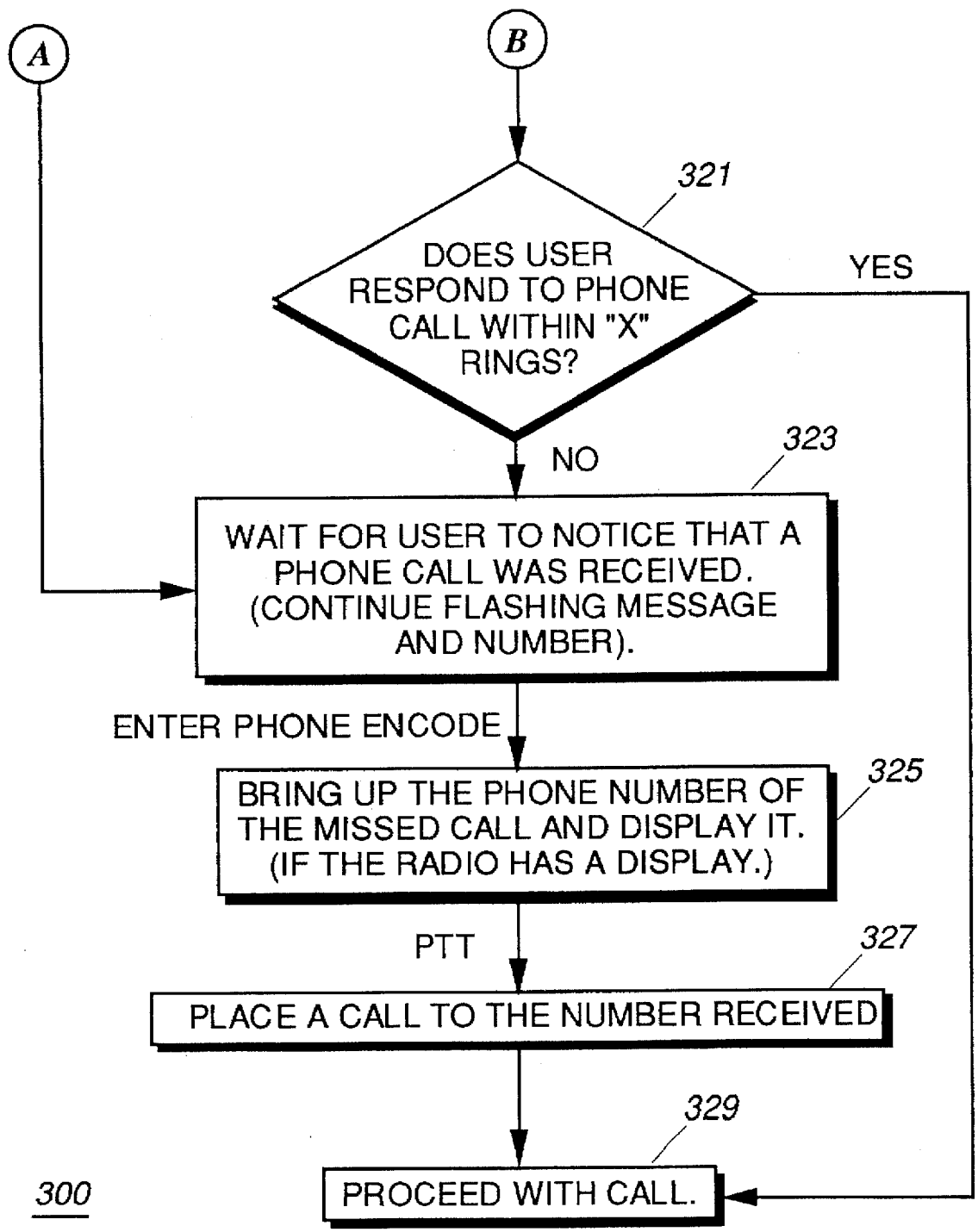

With regard to FIGS. 4 and 5, a flow chart is shown depicting the operation 300 of a subscriber radio 103 as seen in FIG. 1. Initially the subscriber radio receives 301 it's radio address as well as a first OSW. The first OSW from the central station includes at least a first portion of a telephone number. Upon receipt of the first OSW, the subscriber radio stores 303 this information in EEPROM memory. The subscriber radio subsequently transmits 305 a first acknowledgment message to the central station. After transmitting the first acknowledgment message, a second OSW is then received 307 for the central station which contains a second portion of the telephone number. This second portion of the telephone number is also stored 309 in EEPROM memory. The subscriber radio then replies transmitting 311 a second acknowledgment message to the central station.

Once the subscriber radio has received the entire telephone number, it then displayed 313 to the user. The central station then transmits a third OSW which includes a ring signal received 315 at the subscriber radio. The ring signal indicates to the user, either visually, audibly or tactically, that an incoming call is being received. After the ring signal is received, the subscriber radio transmits 317 a third ACK to the central station.

At this time the subscriber radio rings 319 i.e. enters a ring mode or ring state, the user must decide 321 to either respond and proceed 329 with the telephone call or store the telephone number within the radio for retrieval at a later time. It is important to note that the instant invention only operates when the radio is in an "on" and active state. Unlike many other systems, if the subscriber radio is turned "off" or is inactivated, the telephone number information will be lost and is not stored at the central station for later transmission to the subscriber radio. Accordingly, when the subscriber radio is turned "on" and a telephone number is received, the telephone number will be displayed 323 for a predetermined time. The instant system was developed with this feature in mind to avoid complexity and added features such as lists and additional software to store messages at a central location.

When the telephone call has not been immediately accepted, the number can be retrieved 325 from memory and used by the subscriber radio at a later time to initiate or place 327 a telephone call using the stored number. Once contact has been established with the central station, the user may then proceed 329 with the telephone call.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of notifying a radio subscriber unit using a two-way radio communications system that a telephone call has been received at a central station comprising the steps of:

at a central station:
  receiving a telephone call from a caller for a radio subscriber unit;
  decoding an incoming telephone number from the caller;
  transmitting a first signaling word including a radio address and a first portion of the telephone number to a radio subscriber unit which has been identified by the caller;
  listening for a first acknowledgment by the radio subscriber unit, and if the first acknowledgment is received at the central station;
  transmitting a second signaling word including a radio address and a second portion of the telephone number to the radio subscriber unit which has been identified by the caller;
  listening for a second acknowledgment by the radio subscriber unit, and if the second acknowledgment is received;
  transmitting a third signaling word including a radio address and a ring signal for signaling the radio subscriber unit to enter a ring mode;

at the radio subscriber unit:
  receiving a first signaling word including a first portion of a telephone number;
  transmitting the first acknowledgment in response to the receipt of the first signaling word;
  receiving a second signaling word including a second portion of a decoded telephone number;
  transmitting a second acknowledgment of a receipt of the second signaling word;
  receiving a third signaling word including a ring signal;
  displaying the first portion and the second portion of the telephone number to the radio subscriber unit; and
  wherein the radio subscriber unit must be active to receive the first portion and the second portion of the telephone number and further wherein the telephone number is discarded by the central station if the radio is not in an active state.

2. A method for receiving telephone calls at a subscriber radio unit from a central communications station comprising the steps of:

at the central communications station:
  receiving a telephone call from a caller at the central communications station;
    decoding the caller's telephone number to determine a caller's telephone number;
    storing the telephone number momentarily in a predetermined memory location;
    transmitting a first outbound signaling word to a designated subscriber radio unit containing at least the radio address and a first portion of the caller's telephone number;
    listening for an first acknowledgment indicating receipt of the first outbound signaling word and if the first acknowledgment is received;

transmitting a second outbound signaling word to the designated subscriber radio unit containing at least the radio address and a second portion of the caller's telephone number;

listening for a second acknowledgment indicating receipt of the second outbound signaling word and if the second acknowledgment is received;

transmitting signaling information for allowing the subscriber radio unit to enter into a ring state;

listening for an third acknowledgment of the signaling information;

at the subscriber radio unit:

receiving a first outbound signaling word containing a first portion of the caller's telephone number;

transmitting a first acknowledgment in response thereto;

receiving a second outbound signaling word containing a second portion of the caller's telephone number;

transmitting a second acknowledgment in response thereto;

receiving a third outbound signaling word containing signaling information for a ring signal a third acknowledgment in response thereto; and wherein a user of the subscriber radio unit may elect to either receive the incoming telephone call or retrieve the telephone number at a later time provided the telephone number was received and further wherein the central station subsequently purges the telephone number if no contact is made with the subscriber radio unit.

* * * * *